PHOTOCELL INDEXING SYSTEM

Original Filed Sept. 28, 1953 2 Sheets-Sheet 1

INVENTORS
WILLIAM E. BRADLEY
DAVID E. SUNSTEIN
BY
Brown, Penk & Lynnestvedt
AGENTS

PHOTOCELL INDEXING SYSTEM

Original Filed Sept. 28, 1953 2 Sheets-Sheet 2

INVENTORS
WILLIAM E. BRADLEY
DAVID E. SUNSTEIN
BY
Brown, Jenk & Lynnestvedt
AGENTS United States Patent Office Re. 24,781
Reissued Feb. 9, 1960

24,781

PHOTOCELL INDEXING SYSTEM

William E. Bradley, New Hope, and David E. Sunstein, Cynwyd, Pa., assignors to Philco Corporation, Philadelphia, Pa., a corporation of Pennsylvania Original No. 2,749,449, dated June 5, 1956, Serial No. 382,628, September 28, 1953. Application for reissue October 22, 1957, Serial No. 692,517

9 Claims. (Cl. 315—10)

Matter enclosed in heavy brackets [ ] appears in the original patent but forms no part of this reissue specification; matter printed in italics indicates the additions made by reissue.

This invention relates to cathode ray tubes and associated systems, and is described more particularly in connection with color television systems adapted to produce pictures from cathode ray tube screens having different elemental phosphor stripes for emitting light of corresponding colors.

With the color tube screen broken up into elemental phosphor stripes, the different colors are excited by selectively positioning the electron beam in an area providing the desired color. Color pictures are reproduced by modulating the beam with appropriate video signals for each color as the beam is directed to a phosphor stripe of that color. The color stripes are made fine enough and are positioned close enough together so that the light is merged by the eye into a continuous color picture. As a result of the fine spacing, a small departure of the beam from a particular screen position will cause light reproduction of an undesired color. For this reason, dynamically operated beam deflection circuits, used for scanning the beam across the screen to produce a picture raster, may not be readily constructed with enough precision to prevent reproduction of undesired colors due to slight mis-positioning of the beam. Accordingly, position correction circuits are necessary to correct for picture color distortion. Correction is accomplished either by diverting the beam to the proper color area or by modulating the beam with a video signal corresponding to the color of the area to which the beam is directed.

Detection of signals for operating a correction control circuit is conveniently accomplished by use of a photoelectric cell responsive to radiant energy, in the embodiment hereinafter described being light, produced upon the cathode ray screen. The instantaneous beam position may be identified by electrical signals generated by the photocell in response to light emitted from specially placed indexing phosphor stripes. Alternatively the photocell response to light of a particular color generated by the color phosphor stripes on the screen may be used to derive signal identifying beam position.

When photocells are used as beam position detectors, it is difficult to provide output signals from the photocell of high enough amplitude to properly drive the correction control circuits. This results, for one reason, because cathode ray tubes are conventionally constructed with a fluorescent screen and a substantially frusto-conically shaped bell with an electrically conductive but light absorbing post deflection anode coating on its inner surface. The light absorption coating is required to prevent reflection of light by the bell of the tube back through the screen. This anode coating is usually made of a roughened, black, light absorbing conductive surface such as an aquadag coating. When the photoelectric detector cell is mounted at a light pickup station between the fluorescent screen and the electron gun, therefore, only the small percentage of light energy in those direct light rays from the screen to the photocell is usable to provide electrical output signals.

To provide beam position information with the direct rays, the photocell and a suitable lens system is therefore necessary to provide a large enough light incidence angle to encompass the entire screen. This dictates critical mounting positions. The photocell must be placed behind the tube viewing surface, since the entire screen area is necessary for visual presentation of the picture. To obtain the desired viewing angle under these conditions, the photocell is positioned at a station near the minor opening of the frusto-conical shaped bell of the tube. Thus, the distance between the screen and the photocell for a 17″ tube becomes of the order of 250 centimeters, resulting in a luminance signal attenuation in proportion to the square of the distance. The signal level is additionally low because of the inherent phosphor to light conversion inefficiency. At the low signal levels available in prior art systems, therefore, an unfavorable signal-to-noise ratio occurs.

It is accordingly a general object of the invention to provide high efficiency photoelectric control systems for cathode ray tubes.

A further object of the invention is to provide photoelectric control apparatus affording favorable signal-to-noise ratios.

According to one aspect of the invention, therefore, it is proposed to improve the signal-to-noise ratio by increasing the signal level at the photocell. This is accomplished with a light reflective innermost coating on the bell of the cathode ray tube, as distinguished from the conventional light absorption coating. The coating acts as a light funnel for directing a greater percentage of the useful luminance into the photocell that is possible with conventional cathode ray tubes.

In another aspect of the invention, it is proposed to improve the signal-to-noise ratio by decreasing the noise level at the photocell. A primary source of light which appears as undesired noise in the indexing system is the picture upon the screen of the tube. By separating the indexing phosphors and the picture phosphors with an electron-pervious opaque film such as aluminum, direct from the screen to the photocell indexing detector may be blocked. Glass tube bodies however act as light ducts and the tube body may therefore conduct light from the screen to the photocell around a circuitous path. To prevent this, a bend is made in the tube body at which light must be reflected back and forth from the opposite surfaces, and a light absorbing material is coated on the surface of the tube body at the bend to attenuate the light before it reaches the photocell. Thus, indirect light from the screen is also eliminated as a source of indexing noise.

In a typical system embodying the invention, a color tube is used having a plurality of vertical color phosphor stripes arranged in recurring red, green and blue color triplets. Vertical indexing phosphor stripes are provided on the inner screen surface for each triplet, and are separated from the color phosphor stripes by a light-opaque, electron-pervious aluminum film to prevent dilution of the picture. Thus, indexing light is reflected internally toward the photocell pickup station and the picture is reflected externally away from the screen. The indexing light is reproduced in response to constant speed scanning of the beam in the form of pulses having a low duty cycle and a high repetition frequency. In a system having a tube with 450 vertical color triplets and mutually exclusive phosphor color and indexing stripes of the same width with 30 degrees guard spaces between each stripe, and providing constant speed scanning at 15750 lines per second, the duty cycle of the indexing pulse is one-sixth of each triplet cycle and the repetition frequency of the indexing light pulses is in the order of seven megacycles. These light pulses must be accurately reproduced as electrical signals by the photocell to provide acceptable indexing control. A change in the indexing pulse position by as much as five percent will have the same effect as introduction of high amplitude noise pulses to greatly reduce the effectiveness of a correction control circuit by directing at least a portion of the beam to a color region different from that desired. Only .001 microsecond change in transit time of the light need be introduced to cause this order of error in the indexing pulse at the photocell. During this period light travels a distance of about 30 centimeters, which is roughly two-thirds the distance across the face of a 17" cathode ray tube. Therefore specular reflections of light pulses from the reflective bell of the tube will tend to cause the waveform generated by the photocell to be developed at different times when the light source is at various screen positions.

It is therefore another object of the invention to reproduce accurately timed waveforms in photocells excited by a pulsating light source.

Another object of the invention is to provide precisely controlled photoelectric indexing circuits for color television systems or the like.

A still further object of the invention is to provide improved cathode ray tubes.

Further aspects of the invention for providing undistorted waveform reproduction from pulsed light energy sources are realized by providing a diffuse rather than specular reflective coating as the light funnel on the cone of the picture tube. This may be accomplished by roughening the material about the tube bell and depositing a reflective coating on the roughened surface. Alternatively a finely divided layer of reflective heterogeneous crystals of a material such as magnesium oxide may be deposited upon the conductive anode coating. The diffuse light reflective surface causes the output pulses to be developed indepednently of the position of the light source upon the screen. In addition substantially the entire light energy arrives at the photocell pickup station to generate an output pulse of high amplitude in the photocell. A suitable indexing system is advantageously driven by these high amplitude photocell output signals, which indicate the actual beam position at any screen location, to more efficiently and reliably correct color distortion caused by undesired variations in the instantaneous beam position.

Other features and advantages of the invention will be found throughout the following more detailed description which is to be considered in connection with the accompanying drawing, in which.

Figure 1:
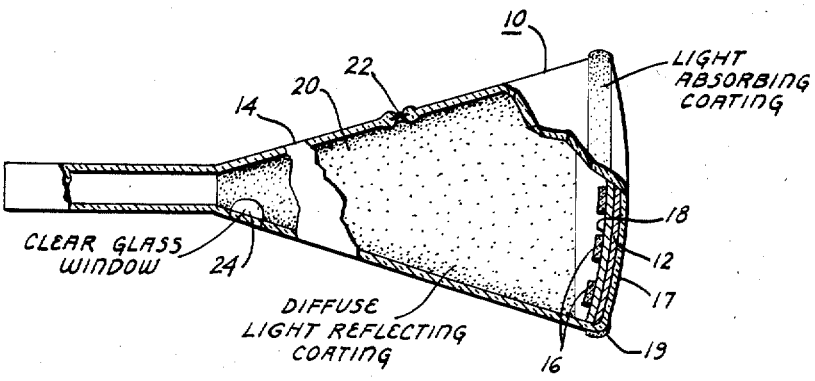
Fig. 1 is a partially broken away elevation view of a cathode ray tube structure constructed in accordance with the invention.

Like reference characters will be used to designate similar component parts of the picture tubes throughout the drawings to facilitate comparison of the several views. Those electrical circuits which of themselves may be entirely conventional and whose details form no part of the present invention are shown in block diagram form to point out more readily the nature and scope of the present invention.

The cathode ray tube 10 of Fig. 1 includes a fluorescent screen 12 affixed to faceplate 17 at the larger opening of the substantially cone shaped bell portion 14. A group of phosphor indexing stripes 16 is provided on the innermost surface of the faceplate 17 with an opaque film 18 sandwiched between the stripes and the fluorescent screen 12. A conductive anode coating 20 is provided in the usual position on the bell of the tube 10 and is connected with an exterior connector fitting 22. In accordance with the present invention this anode coating 20 has an inner surface for diffusely reflecting light from the indexing stripes 16 toward the smaller opening of the bell 14 where a clear glass window 24 is provided. Thus a photoelectric detector may be positioned near the window to collect efficiently light radiated when the cathode ray beam impinges upon the indexing stripes 16.

Figure 1A:
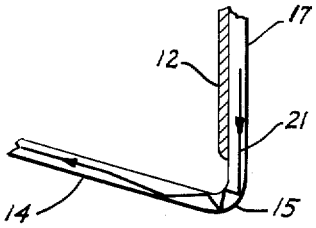
Figs. 1A and 1B are partial views in section of the tube of Fig. 1 illustrating operational features of the invention.
Figure 1B:
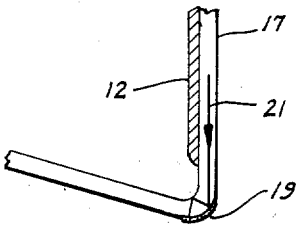

When a glass cathode ray tube body is used, unwanted light from the screen 12 travels through the glass and appears at the window 24 in addition to that light channeled to the window by the funnel coating 20. This light causes noise components to which the photoelectric detector placed at the widow 24 is sensitive. The ray 21 appearing in Fig. 1A is representative of the manner in which light is conducted by the glass tube body. At the bend 15 in the body appearing between the bell 14 and the faceplate 17 the light must be reflected back and forth from opposite surfaces of the glass body to progress about the bend. Accordingly the light absorbing coating 19 is placed on the outer surface of the glass tube body at the bend 15 to absorb the reflected light in the manner illustrated by the ray 21 of Fig. 1B. Alternatively a light absorbing glass envelope might be used. This feature decreases the noise generated in the photo detector by extraneous light in the vicinity of the photocell pickup station at the window 24. A highly favorable signal-to-noise characteristic therefore results from both the increased signal amplitude effected by use of the light funnel coating 20 and the decreased noise level effected by the light absorbing coating 19.

Figure 2:
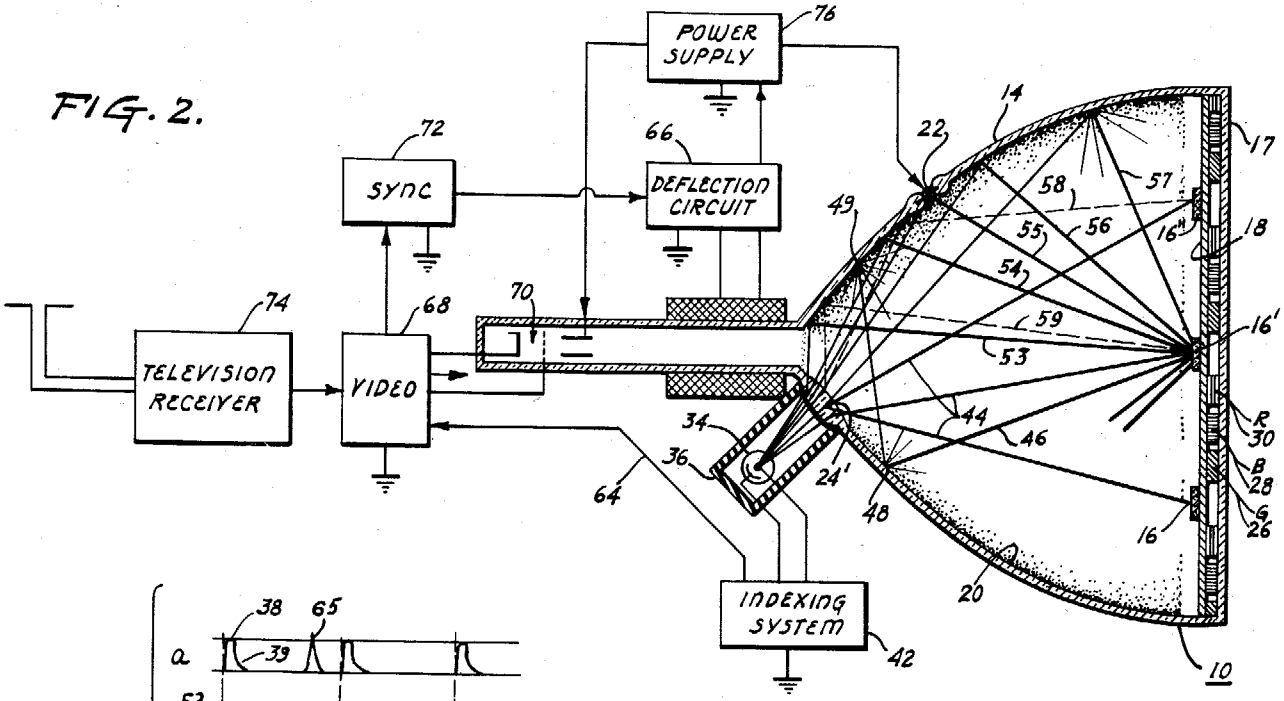
Fig. 2 is a sectional view of a cathode ray color television tube and accompanying block circuit diagram of an indexing system embodying the invention.

The tube 10 of Fig. 2 represents a color television tube similar to that described, but having recurring color triplets arranged across the inner surface of the faceplate 17. Each triplet is composed of red, green and blue phosphor stripes 26, 28 and 30. Both the indexing stripes 16 and the color phosphor stripes are shown enlarged for purposes of clarity and description but they represent a much larger number of stripes. These stripes are fine enough and are placed close enough together so that they have be excited by the cathode ray beam. With intensity modulation of the beam by color television signals, the human eye will therefore see a continuous color television picture of high detail.

The operation of the tube 10 in accordance with the present invention may be recognized by considering that the cathode ray beam has impinged upon the indexing stripe 16' to excite a discrete pulse of light. The light is radiated outwardly in a group of rays generally directed toward the transparent tube window 24', at which a photocell 34 is placed inside an opaque envelope 36. The window 24' may be shaped into the form of a lens for focusing incident light rays upon the photosensitive surface of the photoelectric cell 34.

Figure 3:
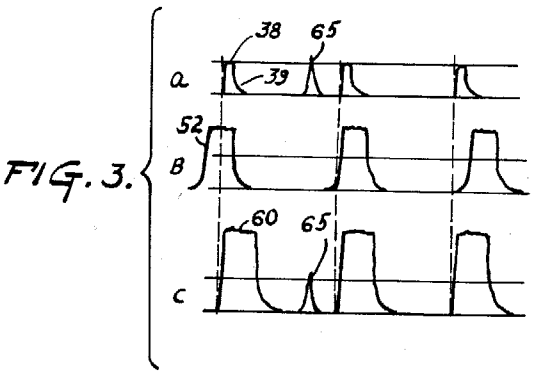
Fig. 3 is a waveform chart illustrating operation of the invention in connection with light pulses such as derived from indexing phosphor stripes.

When the cathode ray beam is scanned normally across the vertical indexing stripes 16 at a constant velocity, a group of recurring light pulses are emitted. The photocell 34 is responsive to the light pulses to generate corresponding electrical waveforms for operating the indexing system 42. The waveforms of Fig. 3 may be considered in connection with this phase of the description. Thus the substantially square wave pulses 38 of Fig. 3A represent the photocell response which would result from only the direct rays 44 radiated by the indexing stripes 16. Light energy is generated by impingement of the cathode ray beam as it sweeps across individual ones of the indexing stripes, and preferably the beam is keyed on at high intensity as the indexing stripes are crossed to provide maximum indexing signal output. For this reason the indexing stripes are placed in mutually exclusive position with respect to the color phosphor so that the video of the picture will not be disturbed during the indexing period. The trailing edge 39 of the waveform in Fig. 3A is produced by phosphorescent decay of light emitted by the fluorescent indexing stripes. For indexing purposes it is desirable to provide a short persistence phosphor with a fast decay to assure that the output waveform is representative only of the time during which the beam is impinging upon the indexing stripe. A suitable phosphor for this purpose is cerium activated calcium aluminum silicate which has an exponential decay pattern occurring in a period in the order of one-twentieth of a microsecond.

By considering the light rays emanating from the index stripes 16 during impingement by the cathode ray beam at different screen positions, the operation of that aspect of the present invention which provides reproduced pulse waveforms of both high amplitude and accurate timing may be understood. Consider, for example, the direct rays 44 which go from the indexing phosphor stripes 16 to the photocell 34. The amount of energy contained in the direct rays is small as compared with all of the remaining rays possible with a diffuse reflecting surface as seen emitted from stripe 16' where energy may be contributed by such rays as 53 to 57 in addition to the direct ray 44. Other representative rays such as 46 may be reflected at the positions 48 and 49 to reach the photocell. The diffuse reflecting surface 20 has the property that light is reflected in different directions and is not restricted to the specular reflection law that the angle of incidence must equal the angle of reflection. Rays 58 and 59 are representative of specular reflection, and it is seen therefrom that a different transit time will be incurred for rays emanating from different screen positions 16' and 16''. This accounts for the erratic timing of the output waveforms of Fig. 3B. This erratic timing causes the indexing system 42 to detect a signal appearing to represent an instantaneous beam position other than actually occurring so that color reproduction errors are not properly corrected. With the diffuse reflecting surface, however, the sum of all reflected rays from any screen position will produce the accurately timed electrical output pulses 60 of Fig. 3C at the photocell 34, since the light may be reflected from positions all along the reflective coating 20 represented by the positioning of rays 53 to 57. The resulting amplitude is much higher than otherwise would be provided from the unreflected energy alone, and the pulse positioning is not modulated by the changes in location of the light source upon the screen.

It is to be appreciated that the only useful energy in a conventional tube would be contained in the direct rays 44 illustrated in Fig. 3A, whereas, with a funnel shaped reflector, there are an infinite number of reflected rays undergoing a single reflection, such as that illustrated by rays 53 to 57, to contribute output energy to the photocell and provide the increased output amplitude of the waveforms in Fig. 3C. Therefore, in accordance with this invention, the output energy level may be increased at least three to five times without substantially distorting the output waveform. The amplitude of the resulting output pulse 60 is large enough so that the noise pulses 65 of a given amplitude have little effect upon indexing operations as compared with the effect of the same pulses upon circuits operating with lower amplitude output pulses 38 of Fig. 3A.

The invention therefore provides means for generating clean, high-amplitude indexing pulses to operate the indexing system 42 coupled to the photocell 34. This indexing system, connected to the video circuit 68 by way of lead 64, serves to correct color distortion by selecting video signal corresponding to the color of the picture element actually being reproduced on the screen. In this manner the video signal, modulating the beam generated in the electron gun portion 70 of the cathode ray tube, corresponds to that desired at the particular position of the beam as positioned by the deflecting circuit 66. The position is precisely identified by the photocell waveform derived from beam impingement upon a particular indexing phosphor. Alternatively, the indexing system might operate upon the deflection circuit 66 to cause deflection of the beam to a position corresponding to that of the current video signal.

Since the video and the deflection signals are synchronized in circuit 72 from transmitted signals developed in the television receiver 74, they are normally caused by ideal circuits to produce a picture with elements laid out in a pattern corresponding to those of the original scene. Only those departures caused by variations in component structures or operating conditions need be corrected. With color television systems having vertical color lines, however, very small variations from the ideal circuit operation will cause entirely erroneous color rendition. Accordingly precise indexing information exactly defining instantaneous beam position with respect to the normally expected beam position is necessary to control color correction circuits. Such information, having a minimum of distortion, is readily obtained by means of the photoelectric cell and diffuse reflective coating of the present invention.

The reflective coating 20, provided in accordance with this invention, may comprise the anode surface itself which is energized from the power supply circuit 76 by way of the anode connector 22. For this type of operation the coating must be electrically conductive, and may therefore comprise a roughened coating of aluminum or silver. Alternatively the reflective coating may be a non-conductive, diffusely-reflecting surface deposited upon the anode such as might be provided by magnesium oxide crystals. The innermost surface, in any event, has light reflective properties and is preferably optically roughened in the presence of light pulses to provide diffuse reflection.

Figure 4:
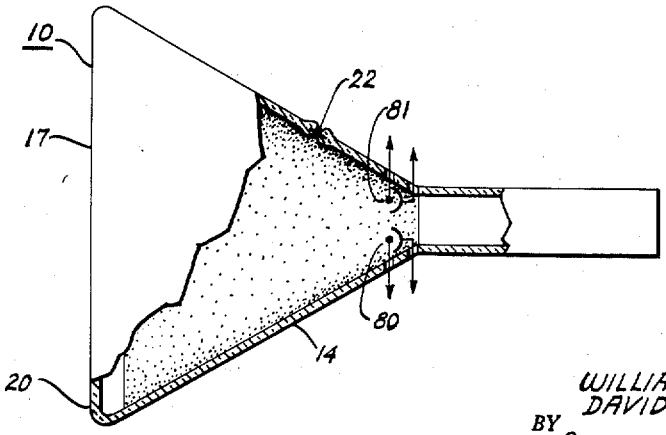
Fig. 4 is a partly broken away elevation view of a further cathode ray tube embodiment of the invention.

As indicated in Fig. 4, the tube may be constructed with internally mounted photoelectric cells 80 and 81, which are located near the minor opening of the reflective coating 20. Whether the photocells are exterior or interior to the tube, however, highly increased indexing efficiency is provided by using the light funnel coating upon the bell 14 of the cathode ray tube. The angle of screen area subtended by the photocell in this system is not as critical as with direct ray pickup systems because the luminous energy from any portion of the screen may arrive at the photocell after reflection from the light funnel. Therefore more convenient mounting of the photocell housing is afforded by the invention.

The present invention therefore provides a convenient and highly efficient photoelectric indexing system, or the like, made possible by the unique construction in a cathode ray tube of providing a light funnel for efficiently channeling light from the screen to a photocell system. Those features of the invention believed descriptive of its nature and scope are defined with particularity in the following claims:

1. A high-definition photo-electric indexing system for color television systems and the like comprising, in combination, a cathode-ray tube having a generally funnel-shaped envelope and having at the major opening thereof a screen comprising both forwardly and rearwardly-presented light-generating phosphor elements separated by a thin electron-transparent light-opaque layer, a photoelectric cell positioned to receive light emitted by said rearwardly-presented elements, and a light-reflecting-and-diffusing area coextensive with a substantial portion of the inner surface of said envelope between the major and minor openings thereof and serving to collect light from said rearwardly-presented elements and to transmit said light to said photo-electric cell, thereby greatly to increase the light from said rearwardly-presented elements impingent on said photo-electric cell.

2. A high-definition photo-electric indexing system as claimed in claim 1, and having a light-absorbing means positioned to reduce the transmission of light from said forwardly-presented light-generating phosphor elements through said envelope toward said photo-electric cell.

3. A high-definition photo-electric indexing system for color television systems and the like comprising, in combination, a cathode-ray tube having a generally funnel-shaped envelope and having at the major opening thereof a screen comprising both forwardly and rearwardly-presented light-generating phosphor elements separated by a thin electron-transparent light-opaque layer, a photo-electric cell positioned adjacent the minor opening of said funnel-shaped envelope to receive light emitted by said rearwardly-presented elements, and a light-reflecting-and-diffusing area coextensive with substantially the entire inner surface of said envelope between said screen and said photo-electric cell and serving to collect light from said rearwardly-presented elements and to transmit said light to said photo-electric cell.

4. A high-definition photo-electric indexing system as claimed in claim 3, and having a light-absorbing means positioned to reduce the transmission of light from said forwardly-presented light-generating phosphor elements through said envelope toward said photo-electric cell.

*5. A cathode-ray tube comprising a screen having spaced areas emissive of radiant energy in response to electron beam impingement, means to receive said energy and to produce an electrical signal indicative of instantaneous beam position on said screen, there being paths for said energy of different lengths for different ones of said areas tending to attenuate to substantially different degrees the energy emitted by said areas, and thus tending to produce undesired substantial amplitude variations in said signal, and means for substantially reducing the differences in amounts of energy received by said first means from said areas, thereby substantially to reduce said amplitude variations.*

*6. A cathode-ray tube according to claim 5, wherein said screen comprises areas emissive of light of different colors in response to electron beam impingement to produce a color image, and said spaced areas are located in predetermined relation to said colored light-emissive areas.*

*7. A cathode-ray tube according to claim 6, wherein said screen comprises stripes emissive of colored light, an electron-transparent light-reflecting layer behind said stripes, and stripes behind said layer emissive of radiant energy for the production of said signal.*

*8. A cathode-ray tube comprising a target electrode having electron-sensitive signal-emissive areas arranged thereon at different distances from a common pick-up region for signal energy emanating from said areas, and means within said tube for equalizing the intensity of the signal energy reaching said common pick-up region from said different areas.*

*9. A cathode-ray tube comprising a target electrode having electron-sensitive signal-emissive areas arranged thereon at different distances from a common pick-up region for signal energy emanating from said areas, means at said pick-up region for translating said energy into an output signal, and means within said tube for rendering said output signal substantially uniform independent of which of said areas is being impinged by electrons at any given instant.*

References Cited in the file of this patent
or the original patent

| | | |
|---|---|---|
| 2,077,270 | Schlesinger | Apr. 13, 1937 |
| 2,244,245 | Ehrenberg | June 3, 1941 |
| 2,312,206 | Calbick | Feb. 23, 1943 |
| 2,415,059 | Zworykin | Jan. 28, 1947 |
| 2,633,547 | Law | Mar. 31, 1953 |
| 2,706,216 | Lesti | Apr. 12, 1955 |
| 2,744,908 | Wallmark | Dec. 18, 1956 |